United States Patent
Denby et al.

(10) Patent No.: US 8,027,267 B2
(45) Date of Patent: Sep. 27, 2011

(54) NETWORK CONDITION CAPTURE AND REPRODUCTION

(75) Inventors: Lorraine Denby, Berkeley Heights, NJ (US); Eric J. Diethorn, Long Valley, NJ (US); Jean Meloche, Madison, NJ (US); Balaji Sathyanarayana Rao, Somerville, NJ (US)

(73) Assignee: Avaya Inc, Basking Ridge, NJ (US)

( * ) Notice: Subject to any disclaimer, the term of this patent is extended or adjusted under 35 U.S.C. 154(b) by 177 days.

(21) Appl. No.: 11/935,515

(22) Filed: Nov. 6, 2007

(65) Prior Publication Data

US 2009/0116397 A1  May 7, 2009

(51) Int. Cl.
 *G01R 31/08* (2006.01)
(52) U.S. Cl. ...................................................... 370/252
(58) Field of Classification Search .................. 370/250, 370/252, 408, 465; 709/224
See application file for complete search history.

(56) References Cited

U.S. PATENT DOCUMENTS

| | | | |
|---|---|---|---|
| 5,521,907 A * | 5/1996 | Ennis et al. | 370/253 |
| 6,314,531 B1 * | 11/2001 | Kram | 714/38 |
| 6,442,141 B1 * | 8/2002 | Borella et al. | 370/248 |
| 6,445,681 B1 * | 9/2002 | Pogrebinsky | 370/252 |
| 6,735,192 B1 * | 5/2004 | Fried et al. | 370/352 |
| 7,031,264 B2 | 4/2006 | Adhikari et al. | |
| 7,428,664 B2 * | 9/2008 | Sirbu | 714/39 |
| 7,633,939 B2 * | 12/2009 | Curran-Gray et al. | 370/389 |
| 2002/0015387 A1 * | 2/2002 | Houh | 370/250 |
| 2002/0105921 A1 * | 8/2002 | Sawyer et al. | 370/328 |
| 2003/0086425 A1 | 5/2003 | Bearden et al. | |
| 2003/0091165 A1 | 5/2003 | Bearden et al. | |
| 2003/0097438 A1 | 5/2003 | Bearden et al. | |
| 2003/0145039 A1 | 7/2003 | Bonney et al. | |
| 2004/0062204 A1 | 4/2004 | Bearden et al. | |
| 2004/0105391 A1 * | 6/2004 | Charcranoon | 370/252 |
| 2004/0252694 A1 | 12/2004 | Adhikari et al. | |
| 2005/0053009 A1 | 3/2005 | Denby et al. | |
| 2005/0207410 A1 | 9/2005 | Adhikari et al. | |
| 2005/0226233 A1 | 10/2005 | Kryuchkov et al. | |
| 2006/0077902 A1 * | 4/2006 | Kannan et al. | 370/250 |
| 2006/0092918 A1 * | 5/2006 | Talalai | 370/352 |
| 2006/0190592 A1 * | 8/2006 | Fujita et al. | 709/224 |
| 2007/0223503 A1 * | 9/2007 | Nagai et al. | 370/408 |
| 2008/0225747 A1 * | 9/2008 | Bedrosian | 370/252 |
| 2009/0003207 A1 * | 1/2009 | Elliott | 370/230.1 |

FOREIGN PATENT DOCUMENTS

WO  0031963 A1  6/2000

OTHER PUBLICATIONS

U.S. Appl. No. 11/536,229 filed in the name of A. Adhikari et al. filed Sep. 28, 2006 and entitled "Root Cause Analysis of Network Performance Based on Exculpation or Inculpation Sets."
U.S. Appl. No. 11/531,910 filed in the name of L. Denby et al. filed Sep. 14, 2006 and entitled "Data Compression in a Distributed Monitoring System."

(Continued)

*Primary Examiner* — Kwang B Yao
*Assistant Examiner* — Jung Liu

(57) ABSTRACT

A network condition capture and reproduction technique captures measurement data characterizing network conditions at a given time between first and second endpoint devices of a network, and utilizes the captured measurement data in a network impairment device to reproduce the network conditions at a later time and possibly in a different place.

14 Claims, 2 Drawing Sheets

OTHER PUBLICATIONS

U.S. Appl. No. 11/496,360 filed in the name of B. Karacali-Akyamac et al. filed Jul. 31, 2006 and entitled "Determination of Endpoint Device Location for Efficient Analysis of Network Performance."

B. Karacali et al., "Scalable Network Assessment for IP Telephony," Proceedings of the 2004 IEEE International Conference on Communications (ICC-04), 2004, pp. 1-14.

"Avaya ExpertNet™ Lite Assessment Tool," White Paper, Apr. 2005, 10 pages.

"Avaya ExpertNet™ VoIP Assessment Tool," White Paper, Sep. 2005, 13 pages.

C. Tang et al., "On the Cost-Quality Tradeoff in Topology-Aware Overlay Path Probing," Proceedings of the 11th IEEE Conference on Network Protocols (ICNP), Nov. 2003, 12 pages.

R. Kumar et al., "Efficient Beacon Placement for Network Tomography," IMC '04, Proceedings of the 4th ACM SIGCOMM Conference on Internet Measurement, ACM Press, Oct. 2004, 6 pages.

Y. Chen et al., "An Algebraic Approach to Practical and Scalable Overlay Network Monitoring," SIGCOMM 04, Proceedings of the 2004 Conference on Applications, Technologies, Architectures, and Protocols for Computer Communications, ACM Press, Aug.-Sep. 2004, pp. 1-12.

Y. Shavitt et al., "Computing the Unmeasured: An Algebraic Approach to Internet Mapping," IEEE Journal on Selected Areas in Communications, Jan. 2004, pp. 67-78, vol. 22, No. 1.

J.D. Horton et al., "On the Number of Distributed Measurement Points for Network Tomography," IMC '03, Proceedings of the 3rd ACM SIGCOMM Conference on Internet Measurement, ACM Press, Oct. 2003, 6 pages.

S. Jamin et al., "On the Placement of Internet Instrumentation," Proceedings of the IEEE Infocom, 2000, 10 pages.

M. Sidi, "Reality-Based VoIP Readiness Testing Using NetAlly®VoIP," Viola Networks, Apr. 2002, pp. 1-10.

M. Sidi, "Readying Your Network for VoIP: Get it Right the First Time," Viola Networks, Apr. 2002, pp. 1-9.

J.Q. Walker, "A Handbook for Successful VoIP Deployment: Network Testing, QoS, and More," NetIQ Corporation, 2002, pp. 1-13.

Y. Breitbart et al., "Topology Discovery in Heterogeneous IP Networks," Proceedings of IEEE Infocom 2000, Mar. 2000, 10 pages.

B. Huffaker et al., "Topology Discovery by Active Probing," CAIDA, 2002, pp. 1-8.

M.R. Meiss et al., "Standards-Based Discovery of Switched Ethernet Topology," Advanced Network Management Lab, Apr. 2002, pp. 1-20.

R. Siamwalla et al., "Discovering Internet Topology," Cornell University, Jul. 1998, pp. 1-16.

C. Perkins et al., "RTP Testing Strategies," Network Working Group, RFC 3158, Aug. 2001, pp. 1-21.

J.M. Chambers et al., "Monitoring Networked Applications with Incremental Quantile Estimation," Statistical Science, Jan. 2006, pp. 1-20.

ITU-T Recommendation P.800, "Methods for Subjective Determination of Transmission Quality," Aug. 1996, 37 pages.

ITU-T Recommendation G.107, "The E-Model, a Computational Model for Use in Transmission Planning," Mar. 2005, 26 pages.

Cantagallo, Marco, "EP Application No. 08168512.5-2416 Extended Search Report Mar. 5, 2009", , Publisher: EPO, Published in: EP.

\* cited by examiner

NETWORK CONDITION CAPTURE AND REPRODUCTION

FIELD OF THE INVENTION

The invention relates generally to communication networks, and more particularly to techniques for monitoring and analysis of such networks.

BACKGROUND OF THE INVENTION

Recent trends in the telecommunications industry towards unified communications emphasize the need for converged networks to deliver acceptable quality of service (QoS) for different types of applications with varying QoS needs. Real-time applications such as video streaming or voice over IP (VoIP) demand strict QoS guarantees from the underlying data network. Understanding the network behavior at all stages of the deployment of such applications is critical for their performance. For example, at the pre-deployment stage, it is necessary to assess whether the network can deliver the required QoS and more importantly which parts of the network fail to do so. After deployment, monitoring the performance of the network is necessary for maintaining acceptable QoS levels.

Numerous network monitoring and analysis systems are known in the art. See, for example, U.S. Patent Application Publication No. 2005/0053009, entitled "Method and Apparatus for Automatic Determination of Performance Problem Locations in a Network," which discloses root cause analysis techniques for determining the particular locations associated with performance problems in a network comprising a plurality of endpoint devices.

Network monitoring and analysis systems often collect low-level network measurements, such as delay, jitter and packet loss, in an effort to understand how network conditions will affect real-time applications. However, such low-level network measurements can be difficult to interpret in terms of their impact on perceived quality of a received stream. For this reason, the low-level measurements are often supplemented by an estimated Mean Opinion Score (MOS) that conveys the overall perceived quality of a received stream on a scale from 1 to 5. See ITU-T Recommendation P.800, "Methods for subjective determination of transmission quality." Another known perceived quality estimation technique utilizes the E-model described in ITU-T Recommendation 0.107, "The E-model, a computational model for use in transmission planning." The E-model uses low-level network measurements to compute a scalar value known as an R-factor that can range from 0 to 100 and can be mapped to an estimated MOS. In the case of VoIP applications, a conversational estimated MOS may be used that characterizes the concurrent perceived quality of received streams in two directions.

A significant drawback of conventional approaches based on the above-noted estimated MOS and the E-model is that these approaches convey only a very simplified description of the experienced quality. Accordingly, these techniques do not allow network engineers to reproduce and experience for themselves the particular quality problems reported by users of network applications, which can make the problems very difficult to analyze and correct. This is particularly true in situations in which the quality problems are attributable to rare or transient network conditions.

SUMMARY OF THE INVENTION

The present invention in one or more illustrative embodiments overcomes the drawback of conventional practice described above by providing techniques for capture and reproduction of network conditions.

In accordance with an aspect of the invention, a network condition capture and reproduction technique captures measurement data characterizing network conditions at a given time between first and second endpoint devices of a network, and utilizes the captured measurement data in a network impairment device to reproduce the network conditions at a later time. The measurement data may comprise, for example, delay data generated from timestamps recorded in or near at least one of the endpoint devices.

The network impairment device may be coupled between the first and second endpoint devices within the network. Alternatively, the network impairment device may be coupled between test endpoint devices external to the network in order to reproduce the network conditions outside of the network.

A number of different approaches may be used to capture and reproduce network conditions in the illustrative embodiments. By way of example, the measurement data may be captured by generating departure and arrival timestamps for each of a plurality of packets, and processing the departure and arrival timestamps to form a sequence of one-way transit times $d_1, d_2, \ldots, d_n$ which characterize the network conditions at the given time. The network conditions characterized by the measurement data may then be reproduced at a later time by storing in a variable delay buffer of the network impairment device an ordered sequence of received packets to be released by the network impairment device at times determined based at least in part on the respective one-way transit times $d_1, d_2, \ldots, d_n$.

As another example, the measurement data may be captured by generating arrival timestamps for each of a plurality of packets, and processing the arrival timestamps to form a sequence of relative timestamps $t_1, t_2, \ldots, t_n$ with respect to a first one of the timestamps, which characterize the network conditions at the given time. The network conditions characterized by the measurement data may then be reproduced by storing in a variable delay buffer of the network impairment device an ordered sequence of received packets to be released by the network impairment device at times determined based at least in part on the respective relative timestamps $t_1, t_2, \ldots, t_n$.

In accordance with another aspect of the invention, the network impairment device may have multiple operating modes, including a listening quality mode and a conversational quality mode. In the listening quality mode, a selected stored sample communication may be sent by the network impairment device to one of the endpoint devices for reproduction at that endpoint device. In the conversational quality mode, bidirectional communication between the first and second endpoint devices is carried out under the network conditions via the network impairment device.

Advantageously, the present invention in the illustrative embodiments provides an improved network monitoring and analysis approach that allows network engineers to reproduce and experience for themselves the particular quality problems reported by users of network applications. This approach considerably facilitates problem analysis and correction, even in those situations in which the quality problems are attributable to rare or transient network conditions.

DETAILED DESCRIPTION OF THE INVENTION

The invention will be illustrated below in conjunction with exemplary network condition capture and reproduction processes and associated network-based communication systems. It should be understood, however, that the invention is not limited to use with the particular processes and communication systems described. For example, the disclosed techniques may be adapted in a straightforward manner for use in any communication application in which it is desirable to provide improved monitoring and analysis of performance problems or other conditions in an associated network.

Moreover, the invention, although particularly well-suited for use in monitoring and analysis of VoIP traffic, also provides significant advantages in multimedia traffic applications or other flow-based real-time applications in which it is desirable to capture and reproduce network conditions that led to particular quality problems.

The invention can thus be used with voice, video, multimedia or any other type of network traffic.

The term "packet" as used herein is intended to include not only IP packets but also other types of packets used in other packet-based communication systems.

The terms "endpoint" and "endpoint device" are used interchangeably herein and are intended to include an origination or destination device associated with a given VoIP communication or other type of packet-based communication. It is to be appreciated that a given endpoint device therefore need not be a terminal device of the system, and may comprise an internal network element such as, for example, a gateway, a router, a switch, or any other type of non-terminal network element. A given pair of endpoint devices in the illustrative embodiment may be viewed generally as comprising the source and destination nodes of a particular communication path. An endpoint device may therefore be a device comprising or otherwise associated with any network node.

The term "measurement data" as used herein is intended to include, for example, delay, jitter, loss, or other QoS-related statistics, associated analysis results determinable therefrom, as well as other types of data.

Figure 1:
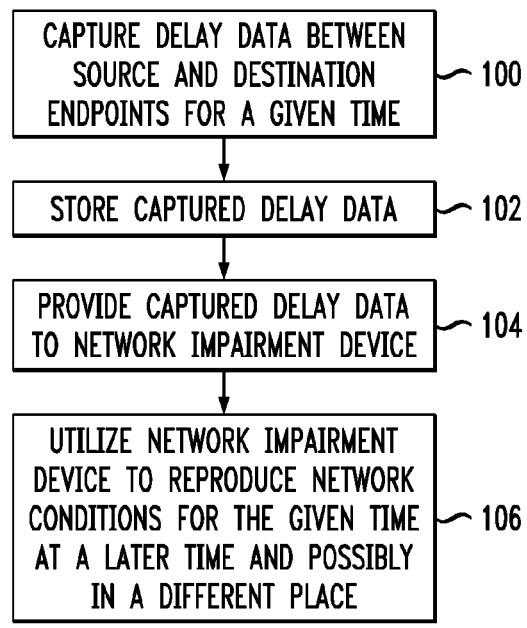
FIG. 1 is a flow diagram of a network condition capture and reproduction process in an illustrative embodiment of the invention.

With reference now to FIG. 1, an exemplary network condition capture and reproduction process is shown.

In step 100, delay data is captured between source and destination endpoint devices of a network for a given time. The given time may be, for example, a specified period of time, or a number of designated points in time. Other techniques for specifying the given time may be used, such as specifying the time in terms of an approximate number of packets transmitted at an assumed packet rate. As will be described below in conjunction with FIGS. 2A and 2B, the delay data may be generated from timestamps recorded in or near at least one of the endpoint devices. The delay data may be viewed as an example of what is more generally referred to herein as measurement data. Other embodiments may capture different types of measurement data to characterize network conditions at the given time.

The source and destination endpoint devices are examples of what are more generally referred to herein as first and second endpoint devices. A given endpoint device may of course operate as both a source endpoint device and a destination endpoint device, for example, in the case of bidirectional communication. Thus, designation of particular endpoint devices herein as source or destination endpoint devices is intended for purposes of simplicity and clarity of illustration, and should not be construed as limiting in any way.

In step 102, the captured delay data is stored. For example, the captured delay data may be stored in a memory within or associated with one of the endpoint devices, or in memories within or associated with the respective endpoint devices.

In step 104, the captured delay data is provided to a network impairment device. Illustrative embodiments of the network impairment device will be described in greater detail below in conjunction with FIGS. 3 and 4.

In step 106, the network impairment device is utilized to reproduce the network conditions for the given time at a later time and possibly in a different place. For example, the network impairment device may be inserted into the network in a communication path between the source and destination endpoint devices in order to reproduce the network conditions from the given time at a later time. As another example, the network impairment device may be inserted between test source and destination endpoint devices external to the network in order to reproduce the network conditions outside of the network. In such an arrangement, a network engineer can reproduce the network conditions that led to a particular quality problem, using source and destination endpoint device equipment of the same type that was used when the problem was encountered. This not only allows the engineer to reproduce and troubleshoot the problem outside of the network, but ensures a more accurate reproduction of the problem by taking into account any effects associated with the particular type(s) of endpoint devices involved. Also, it gives the engineer the option of changing the particular types of endpoint devices used in the reproduction, so as to determine if different endpoint devices would have mitigated any quality problems that were experienced under the captured network conditions.

It should be noted that the network impairment device may be operable in a number of different selectable modes. For example, the network impairment device may be operable in a listening quality mode or a conversational quality mode.

In the listening quality mode, a stored sample communication may be sent by the network impairment device to one of the endpoint devices for reproduction at that endpoint device. The device may store multiple sample communications of different types, so that the network engineer can vary the type of communication that is used in the listening quality mode. The network engineer can listen to a voice sample that is subjected to the captured network conditions in each of the two directions separately. The ability to choose the voice sample is beneficial because different network impairments may have different impacts on different voice samples, and such variations are not captured by conventional techniques such as the estimated MOS.

In the conversational quality mode, bidirectional communication between the endpoint devices is carried out under the network conditions via the network impairment device. Thus, a pair of network engineers, one at each endpoint device, could carry out a conversation and each of the streams will be subject to any impairments reflected in the captured network conditions. This allows the engineers to experience what a conversation would have been like between, for example, New York and Los Angeles at a particular time on a particular day using particular types of endpoint devices. As indicated above, the engineers are free to utilize different types of endpoint devices than those utilized in the data capture portion of the process, and can thus determine, for example, if using different endpoint devices would have mitigated any quality problems associated with the captured network conditions. References herein to network engineers are intended to be construed broadly, so as to encompass, by way of example, other types of personnel such as testers, technicians, administrators, etc.

It is to be appreciated that the particular arrangement of processing steps in FIG. 1 is presented by way of illustrative example only. Numerous alternative arrangements of processing steps may be used to capture measurement data indicative of network conditions at a given time and to utilize that captured data to reproduce the network conditions at a later time.

The illustrative embodiment of FIG. 1 may capture delay data by, for example, collecting packet departure and arrival timestamps in each of two directions, between first and second endpoint devices of the network. The timestamps may be used to compute packet delays in each of the two directions in a straightforward manner. The delays in each of the two directions may then be used to configure the network impairment device that is placed between two endpoint devices for the purpose of reproducing the listening quality and the conversational quality that was experienced at the time that the timestamps were recorded.

It is preferable that the network measurements be made at or near the ingress and egress of each endpoint, since data taken at these points best represents the time-relative characteristics of packets entering and leaving the corresponding endpoint. Alternatively, and somewhat simpler in implementation, data can be measured at any given point within the network between the two endpoints. However, the network conditions represented by data measured at such a point do not necessarily reflect the quality perceived at each endpoint.

Figure 2A:
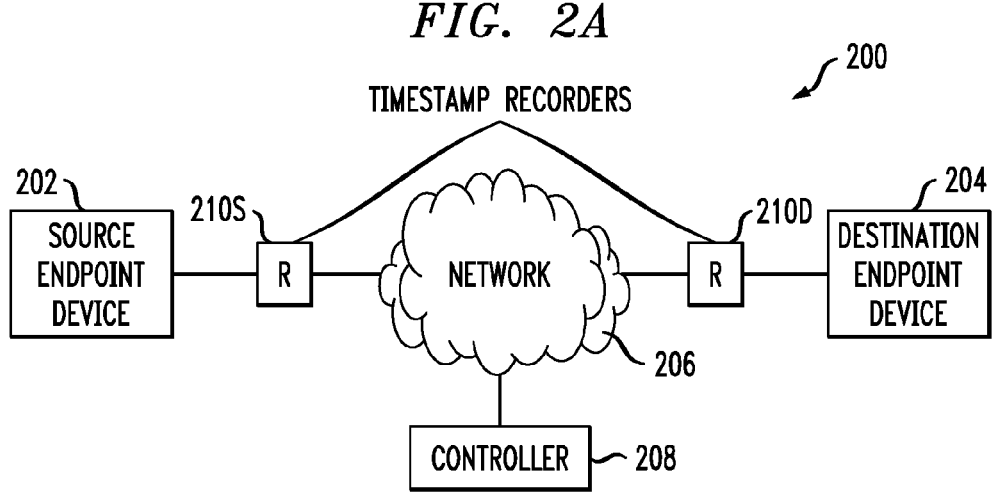
FIGS. 2A and 2B show portions of a communication system with network condition capture functionality in an illustrative embodiment of the invention.

FIG. 2A shows a portion of a network-based communication system 200 that includes network condition capture functionality. The portion of the system 200 as shown includes a source endpoint device 202 that communicates with a destination endpoint device 204 over a network 206. Although shown for simplicity of illustration as terminal endpoint devices in the figure, one or more of the endpoint devices of the system, as indicated previously, may comprise or be otherwise associated with an internal node of network 206. Also, as mentioned above, the two endpoint devices may each operate as source and destination devices, as in the case of bidirectional communication. So designation of one as the source and the other as the destination in FIG. 2A and other figures herein is purely arbitrary, for purposes of illustration with regard to communication in a particular direction.

The system 200 further includes a controller 208 coupled to the network 206. The controller in this embodiment may be used to facilitate the capture of measurement data. For example, the controller may comprise a network monitoring and analysis system controller of a type similar to that described in the above-cited U.S. Patent Application Publication No. 2005/0053009. Instead of or in addition to being coupled to the network 206, the controller 208 may be coupled to one or both of the endpoint devices 202, 204.

The controller may be implemented as a central controller, a distributed controller, or using a combination of centralized and distributed techniques. For example, the functions of the controller may be distributed at least in part across one or more of the endpoint devices of the system. The term "controller" as used herein is therefore intended to include a centralized controller, a distributed controller, or a hybrid controller which is at least partially centralized and at least partially distributed.

Alternative embodiments may eliminate the controller 208 and configure the endpoint devices 202, 204 or other system elements to capture delay data without the use of a common controller.

In operation, VoIP communications or other types of packet-based communications are made between the source and destination endpoint devices 202, 204 in the system 200, and delay data is captured for a given time. The system illustratively utilizes timestamp recorders 210S and 210D for this purpose. The timestamp recorders are placed close to the respective source and destination endpoint devices, so as to accurately reflect the timing of transmission or receipt of packets by those devices. As will be described in greater detail below, it is possible to capture delay data using only a single timestamp recorder associated with the destination endpoint device. In such an embodiment, the timestamp recorder 210 may be eliminated. The operation of the timestamp recorders may be directed by their associated endpoint devices, by the controller 208, or by a combination of these or other system elements.

The timestamp recorders 210S and 210D in this embodiment are thus utilized to implement the delay data capture aspects of the FIG. 1 process. These devices or their associated endpoints may also be configured to store captured delay data, and to provide the captured delay data to the network impairment device.

Figure 2B:
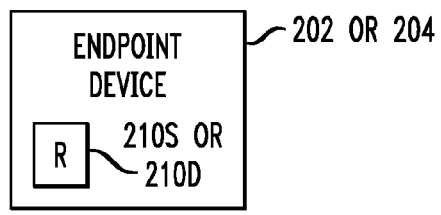

As shown in FIG. 2B, a given one of the timestamp recorders 210S or 210D may be incorporated into its corresponding source or destination endpoint device. Thus, one or more of the endpoint devices of system 200 may have an integral timestamp recording capability.

The endpoint devices 202, 204 may be otherwise conventional wired or wireless IP telephones (including devices commonly referred to as IP "softphones"), personal digital assistants (PDAs), mobile telephones, personal computers (PCs), single-board computers (SBCs) or other types of processing devices.

As indicated previously, the endpoint devices 202, 204 are each typically configured to operate as both source and destination, as in the case of a bidirectional VoIP communication established between a given pair of endpoints. Thus, each will likely incorporate receiver circuitry and transmitter circuitry. Conventional aspects of such endpoint devices are well-known in the art and therefore not described in further detail herein.

Additional system elements, not shown in FIG. 2A, may be coupled between each of the endpoints 202, 204 and the network 206, or otherwise arranged within the system 200, in accordance with conventional practice.

Network 206 may represent, e.g., a global communication network such as the Internet, a wide area network, a metropolitan area network, a local area network, a wireless cellular network, a public switched telephone network (PSTN), or a satellite network, as well as portions or combinations of these or other communication networks. The network 206 may comprise conventional IP routers, gateways, switches or other packet processing elements.

The communications between the endpoint devices 202, 204 may comprise, for example, VoIP communications. Standard protocols that are commonly utilized in VoIP communications include User Datagram Protocol (UDP), described in Internet Engineering Task Force (IETF) Request for Comments (RFC) 768, "User Datagram Protocol," August 1980, Real-Time Transport Protocol (RTP), described in IETF RFC 1889, "RTP: A Transport Protocol for Real-Time Applications," and RTP Control Protocol (RTCP), described in IETF RFC 3158, "RTP Testing Strategies," August 2001, all of which are hereby incorporated by reference herein.

By way of example, VoIP communications may comprise RTP voice data packets that are sent over an IP network using UDP. More particularly, the RTP packets are encapsulated in UDP packets which are themselves encapsulated in IP packets. Of course, a wide variety of protocols and encapsulation arrangements may be used in implementing the invention.

Signaling protocols utilizable in conjunction with VoIP communications to provide functions such as call setup, teardown and dial tone include Session Initiation Protocol (SIP), described in IETF RFC 3261, "SIP: Session Initiation Protocol," June 2002, ITU-T Recommendation H.323, "Packet-based multimedia communication systems," November 2000, and ITU-T Recommendation H.225, "Call signaling protocols and media stream packetization for packet-based multimedia communication systems," November 2000, all of which are incorporated by reference herein.

VoIP communications or other communications in the context of the present invention may be implemented utilizing one or more of the above-cited protocols, or other suitable protocols, as will be readily apparent to those skilled in the art.

It should be emphasized that the simplified configuration of the system 200 as shown in FIG. 2A is for purposes of illustration only, and should not be construed as limiting the invention to any particular arrangement of elements. For example, the system 200 may include additional endpoints, comprising other types and arrangements of routing elements, switching elements or other processing elements. A given endpoint device or other processing element of the system will generally comprise a processor coupled to a memory, and will typically further include a network interface.

Figure 3:
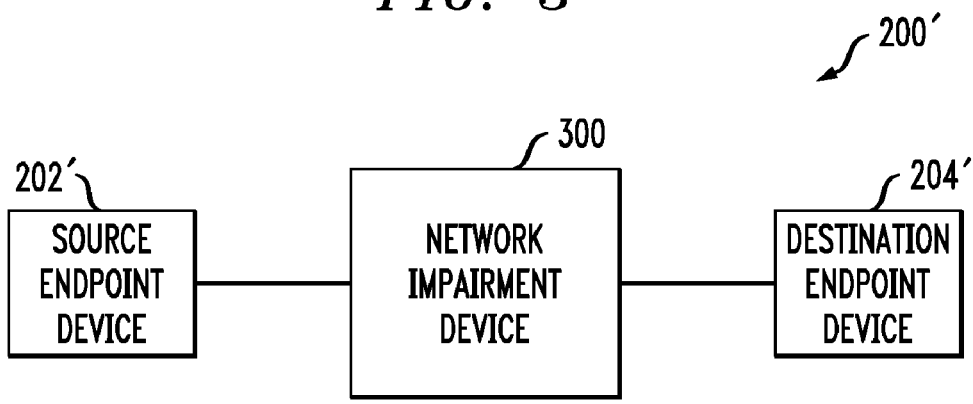
FIG. 3 is a block diagram showing one possible configuration of a system for reproduction of previously-captured network conditions in an illustrative embodiment.

FIG. 3 illustrates the manner in which the delay data captured for a given time can be used to reproduce network conditions for the given time at a later time and possibly in a different place. A system 200' as shown comprises source and destination endpoint devices 202', 204' with a network impairment device 300 coupled between the devices. The source and destination endpoint devices 202', 204' may be the same devices 202, 204 utilized when the delay data was captured. Thus, the network impairment device may be inserted into the system 200 as shown in FIG. 2A. Alternatively, the system 200' may comprise a separate testing system in which the network conditions captured for the given time are reproduced outside of system 200. In this case, the source and destination endpoint devices 202', 204' are preferably test source and destination endpoint devices of the same type that were used in the actual system when the delay data was captured, so as ensure better reproduction of any quality problem.

Figure 4:
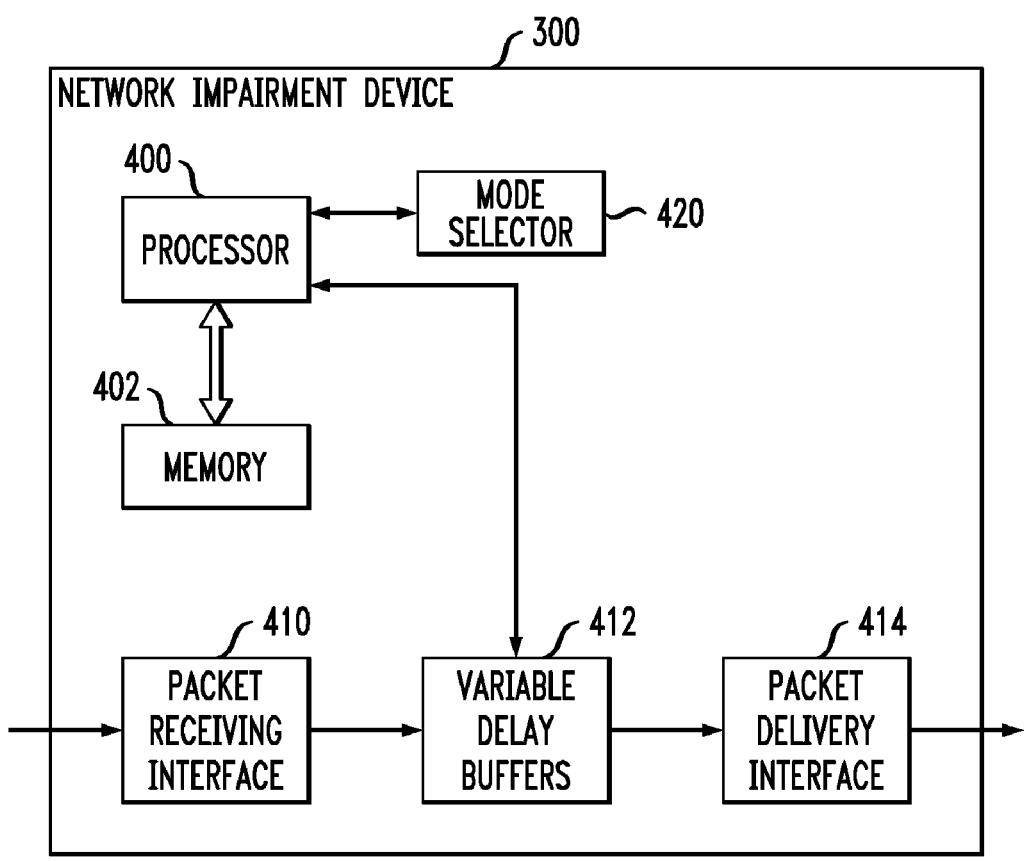
FIG. 4 shows a more detailed view of one possible implementation of a network impairment device of the FIG. 3 system.

The network impairment device 300 is shown in greater detail in FIG. 4. In this embodiment, the network impairment device comprises a processor 400 coupled to a memory 402. Software for implementing the reproduction portion of the network condition capture and reproduction process of FIG. 1 may be stored in memory 402 and executed by the processor 400. The memory 402 may represent random access memory (RAM), read-only memory (ROM), optical or magnetic disk-based storage, or other storage elements, as well as combinations thereof. The processor 400 may comprise, for example, a microprocessor, an application-specific integrated circuit (ASIC), a computer or other device(s).

Also included in the network impairment device 300 are a packet receiving interface 410, a set of variable delay buffers 412, and a packet delivery interface 414. As indicated previously, the network impairment device may be operative in multiple modes, such as a listening quality mode and a conversational quality mode. Thus, the interfaces 410, 414 and the variable delay buffers 412 may be configured to support bidirectional communication between the endpoint devices 202', 204'. In such an arrangement, one portion of the packet receiving interface may receive packets from the endpoint 202' that are delivered to the endpoint device 204' via a corresponding portion of the packet delivery interface. Similarly, another portion of the packet receiving interface may receive packets from the endpoint 204' that are delivered to the endpoint device 202' via a corresponding portion of the packet delivery interface. The variable delay buffers 412 in an arrangement of this type are also separated into different sets of buffers for each direction of communication.

The particular mode of operation of the network impairment device 300 is selected by mode selector 420 under the control of the processor 400.

The delay data captured in step 100 of the FIG. 1 process may be stored in the endpoint devices 202, 204 or their associated timestamp recorders 210 and is provided to the network impairment device 300 where it is stored in memory 402. The processor 400 retrieves the captured delay data from the memory and utilizes it to control the amount of variable delay provided by the variable delay buffers 412, so as to reproduce the network conditions at the given time as characterized by the captured delay data.

It is to be appreciated that the particular network impairment device shown in FIG. 4 is just one example of such a device. Alternative embodiments may utilize different arrangements of processor, memory and interface elements, and different techniques for reproducing network conditions based on previously-captured measurement data.

A number of different capture and reproduction techniques will now be described in greater detail with reference to VoIP communications. Bidirectional VoIP communications generally comprise a sequence of packets sent from a source endpoint to a destination endpoint and a sequence of packets sent in the opposite direction. Thus, there is a pair of VoIP packet streams being exchanged between the two endpoints. For simplicity of description, the following examples will focus on an arbitrary one of the two packet streams. Again, the endpoints could be terminal endpoints or endpoints that are internal to the network.

It will be assumed that the source endpoint sends the packets with regularity, for example, one packet every 50 milliseconds. It is further assumed that the network is used by a variety of competing applications, and that as a result the network delivers the successive packets to the destination after delays that vary from one packet to the other. Step 100 of the FIG. 1 process captures these delays for a given time, using the techniques described below. Two exemplary capture approaches will be described, although it should be understood that a wide variety of other capture techniques may be used in implementing the invention. Also, the described techniques may be adapted in a straightforward manner for use with different types of communications other than VoIP.

In a first capture approach, the source endpoint device 202 and the destination endpoint device 204 cooperate in determining departure and arrival timestamps for each packet. This approach generally requires that clocks on the source and destination endpoints be synchronized with one another, or that the timestamps be post processed to correct for skew and drift using known techniques. The departure and arrival timestamps for each packet can be subtracted from one another to form a sequence of one-way transit times $d_1$, $d_2, \ldots, d_n$ which represent the contribution of the network to VoIP performance. If the ith packet is lost, its corresponding transit time $d_i$ is assumed to be infinite. The packets can be indexed in this example because in a typical VoIP stream there is a packet number in the RTP header of each packet.

As mentioned above, the departure and arrival timestamps can be captured using the timestamp recorders 210S and 210D, which may be incorporated into the respective source and destination endpoint devices, or arranged near those devices within the network. In the latter case, the arrangement of the timestamp recorders within the network preferably ensures that there is no significant delay incurred between the endpoints and their respective recorders.

In a second capture approach, the destination endpoint device 204 operates without the cooperation of the source endpoint device 202 and simply determines arrival timestamps for each packet. The arrival timestamps may be captured using the timestamp recorder 210D, which as indicated previously may be internal to the destination endpoint device 204 or arranged near that device in the network. The first arrival timestamp is subtracted from each of the arrival timestamps to form relative timestamps $t_1, t_2, \ldots, t_n$ with respect to the first timestamp. If the ith packet is lost, its corresponding relative timestamp $t_i$ is assumed to be infinite. The relative timestamp values $t_i$ form a generally increasing sequence from the initial relative timestamp value $t_i$ which is zero. Again, the packets can be indexed in this example because in a typical VoIP stream there is a packet number in the RTP header of each packet.

Techniques for reproducing network conditions from delay data captured using the first and second capture approaches above will now be described.

In reproducing network conditions from the one-way transit times $d_1, d_2, \ldots, d_n$ generated by the first capture approach, the variable delay buffers 412 of the network impairment device 300 are configured under the control of the processor 400 to delay the successive packets such that the packets are delivered with the desired one-way transit times $d_1, d_2, \ldots, d_n$. As mentioned in conjunction with FIG. 4, the network impairment device includes an interface for receiving packets from the source endpoint and an interface for delivering packets to the destination endpoint. The network impairment device may include two threads of execution, one for receiving the packets from the source endpoint and the second for keeping track of the time and releasing the packets at the appropriate time. The variable delay buffers may therefore store an ordered sequence of received packets to be released at specified future times as determined by the respective one-way transit times $d_1, d_2, \ldots, d_n$. More specifically, when the network impairment device receives the ith packet, it places that packet in a buffer for release at time $d_i$ in the future. If $d_i$ is infinite, the packet is considered lost and is not delivered by the network impairment device.

It should be noted that the variable delays implemented in the network impairment device 300 may be adjusted to reflect any additional delays associated with transmission of packets to the impairment device from the source endpoint and from the impairment device to the destination endpoint. For example, when the impairment device receives the ith packet, that packet might have already incurred some delay depending on how far the source endpoint is from the impairment device. Similarly, when the ith packet is released by the impairment device, that packet may incur some more delay depending on how far the destination endpoint is from the impairment device. In order to account for additional delays of this type, including delays within the network impairment device itself the impairment device may be configured to release the packets in accordance with adjusted one-way transit times $d_1-d, d_2-d, \ldots, d_n-d$, where d is selected to offset the additional delays noted above.

In reproducing network conditions from the relative timestamps $t_1, t_2, \ldots, t_n$ generated by the second capture approach, the variable delay buffers 412 of the network impairment device 300 are again configured under the control of the processor 400 to delay the successive packets such that the packets are delivered with the desired timing. The reproduction process is similar to that described above in the context of the first capture approach. However, the network impairment device in this case must be configured not only with the relative timestamps $t_1, t_2, \ldots, t_n$ but also with a base one-way delay $d_b$. One can think of $d_b$ as the delay for the first packet because $t_1$ is zero by construction. When the network impairment device receives the ith packet, it places that packet in a buffer for release at time $d_i+d_b$ in the future. Again, if $d_i$ is infinite, the packet is considered lost and is not delivered by the network impairment device. As with reproduction under the first approach, an amount of delay d may be incorporated into the computation of the release times to offset additional delays relating to the reproduction.

The particular capture and reproduction approaches described above are exemplary only. Numerous other techniques may be used to capture measurement data for a given time and reproduce at a later time the particular network conditions characterized by that data. Also, although described with reference to communication in a particular direction, these approaches can be extended in a straightforward manner to bidirectional communications.

Responsive to reproduction of network conditions associated with a particular quality problem, various adjustments or modifications in the network may be made in order to alleviate or overcome the problem. A given embodiment of the invention may therefore include such adjustments or modifications as determined based on reproduced network conditions.

As previously noted, one or more of the network condition capture and reproduction functions described above in conjunction with the illustrative embodiments of the invention may be implemented in whole or in part in software utilizing processing elements such as processor 400 and memory 402 in the network impairment device 300, or similar elements in the endpoint devices 202, 204, timestamp recorder(s) 210, or other parts of the system. A wide variety of other suitable arrangements of hardware, firmware or software may be used to implement the techniques of the invention.

It should again be emphasized that the above-described arrangements are illustrative only. For example, alternative embodiments may involve different arrangements of endpoint devices, impairment devices, controllers or other system elements, different types of network traffic, different types of capture or reproduction techniques, etc. Furthermore, the particular assumptions used in the context of describing the illustrative embodiments should not be viewed as requirements of the invention, and embodiments may be constructed in which one or more of these assumptions do not apply. These and numerous other alternative embodiments within the scope of the following claims will be apparent to those skilled in the art.

What is claimed is:

1. A method comprising:
receiving, by a first network element, first measurement data and second measurement data from a first endpoint device and a second endpoint device in a network, respectively, wherein:
(i) the first measurement data is generated based on departure timestamps and arrival timestamps of a first plurality of packets received at an ingress and an egress of the first endpoint device, and
(ii) the second measurement data is generated based on departure timestamps and arrival timestamps of a second plurality of packets received at an egress and an ingress of the second endpoint device;
processing, by the first network element, the first measurement data and the second measurement data to form one-way transit times $d_1, d_2, \ldots, d_n$ that characterizes network conditions at a given time between the first endpoint device and the second endpoint device;
storing, in a first variable delay buffer of the first network element, a first ordered sequence of packets received from the first endpoint device, wherein each packet of the first ordered sequence of packets is to be transmitted by the first network element based on respective one-way transit times $d_1, d_2, \ldots, d_n$;
adjusting, by the first network element, the one-way transit times $d_1, d_2, \ldots, d_n$ to offset additional delays, $\Delta$, that are attributable to reproducing the network conditions, wherein the one-way transit times $d_1, d_2, \ldots, d_n$ are adjusted by the first network element to produce an adjusted one-way transit times $d_1-\Delta, d_2-\Delta, \ldots, d_n-\Delta$; and
transmitting, by the first network element, each packet of the first ordered sequence of packets stored in the first variable delay buffer based on the adjusted one-way transit times $d_1-\Delta, d_2-\Delta, \ldots, d_n-\Delta$ to the second endpoint device.

2. The method of claim 1 wherein a first interface and the first variable delay buffer of the first network element are for receiving the first ordered sequence of packets from the first endpoint device;
wherein a second interface and a second variable delay buffer of the first network element are for receiving a second ordered sequence of packets from the second endpoint device; and
wherein the first interface and the first variable delay buffer are different from the second interface and the second variable delay buffer.

3. The method of claim 1 wherein the first network element is coupled to a communications path of the network; and
wherein the first network element is coupled to the communications path at a location that is between the first endpoint device and the second endpoint device for reproducing the network conditions.

4. The method of claim 1 wherein the first network element is coupled to a communications path that is external to the network;
wherein the first network element is coupled to the communications path at a location that is between a third endpoint device and a fourth endpoint device for reproducing the network conditions that occurred between the first network element and the second network element; and
wherein the first endpoint device and the second endpoint device are different from the third endpoint device and the fourth endpoint device.

5. The method of claim 1 wherein the first network element is configured to operate in at least one of a listening mode and a conversational mode.

6. The method of claim 5 further comprising:
in the listening mode, selecting, by the first network element, a voice sample from a plurality of voice samples stored at the first network element, wherein each voice sample in the plurality of voice samples are different; and
transmitting, by the first network element to the second endpoint device, the selected voice sample based on the respective one-way transit times $d_1-\Delta, d_2-\Delta, \ldots, d_n-\Delta$.

7. The method of claim 5 further comprising:
(i) receiving, by the first network element, a second ordered sequence of packets from a third endpoint device located at a first geographic location,
(ii) transmitting, by the first network element, each packet of the second ordered sequence of packets to a fourth endpoint device based on the one-way transit times $d_1-\Delta, d_2-\Delta, \ldots, d_n-\Delta$; and
(iii) receiving, by the first network element, a third ordered sequence of packets from the fourth endpoint device located at a second geographic location, and
(iv) transmitting, by the first network element, each packet of the third ordered sequence of packets to the third endpoint device based on the one-way transit times $d_1-\Delta, d_2-\Delta, \ldots, d_n-\Delta$; and
wherein the first geographic location is in a geographic time zone that is different from the second geographic location.

8. The method of claim 1 further comprising:
receiving, by the first network element, third measurement data from the second endpoint device;
wherein the third measurement data is computed by subtracting a first arrival timestamp from each subsequent arrival timestamp of a third plurality of packets to form relative timestamps $t_1, t_2, \ldots, t_n$;
wherein the relative timestamps $t_1, t_2, \ldots, t_n$ are different from:
(i) the one-way transit times $d_1, d_2, \ldots, d_n$, and
(ii) the adjusted one-way transit times $d_1-\Delta, d_2-\Delta, \ldots, d_n-\Delta$.

9. The method of claim 8 wherein the first network element is configured with a base one-way delay $d_b$, and wherein the base one-way delay $d_b$ is a delay of the first packet in the third plurality of packets.

10. The method of claim 9 further comprising:
storing, by the first network element, a second ordered sequence of packets received from the second endpoint device in a second variable delay buffer of the first network element.

11. The method of claim 8 further comprising:
adjusting, by the first network element, the relative timestamps $t_1, t_2, \ldots, t_n$, to produce adjusted relative timestamps $t_1-\Delta, t_2-\Delta, \ldots, t_n-\Delta$; and
transmitting, by the first network element, each packet of the second ordered sequence of packets stored in the second variable delay buffer based on the adjusted relative timestamps $t_1-\Delta, t_2-\Delta, \ldots, t_n-\Delta$ to the first endpoint device;
wherein the adjusted relative timestamps $t_1-\Delta, t_2-\Delta, \ldots, t_n-\Delta$ is different from:
(i) times $d_1, d_2, \ldots, d_n$, and
(ii) times $d_1-\Delta, d_2-\Delta, \ldots, d_n-\Delta$.

12. The method of claim 1 further comprising:
dropping, by the first network element, a packet having a delay that is associated with a lost packet when reproducing the network conditions.

13. The method of claim 12 wherein the dropped packet is indexed by the first network element based on a Real-time Transport Protocol (RTP) header of the dropped packet.

14. The method of claim 1 wherein processing the one-way transit times $d_1, d_2, \ldots, d_n$ requires clocks of the first endpoint device and the second endpoint device be synchronized with one another.

* * * * *